(12) United States Patent
Ishida (10) Patent No.: US 8,358,927 B2
(45) Date of Patent: Jan. 22, 2013

(54) IMAGING APPARATUS

(75) Inventor: Ken Ishida, Osaka (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 13/197,858

(22) Filed: Aug. 4, 2011

(65) Prior Publication Data

US 2012/0033958 A1    Feb. 9, 2012

(30) Foreign Application Priority Data

Aug. 5, 2010    (JP) ................ 2010-175965

(51) Int. Cl.
*G03B 7/18*    (2006.01)

(52) U.S. Cl. ...................... 396/283; 396/312

(58) Field of Classification Search ............ 396/283
See application file for complete search history.

(56) References Cited

U.S. PATENT DOCUMENTS

| | | | |
|---|---|---|---|
| 7,720,369 B2 | 5/2010 | Nose | |
| 2005/0231612 A1* | 10/2005 | Suzuki et al. | 348/231.99 |
| 2006/0132621 A1* | 6/2006 | Suzuki et al. | 348/231.4 |
| 2006/0158532 A1* | 7/2006 | Ayaki et al. | 348/229.1 |
| 2008/0205869 A1 | 8/2008 | Nose | |
| 2010/0033598 A1* | 2/2010 | Suzuki et al. | 348/231.4 |
| 2011/0128409 A1* | 6/2011 | Suzuki et al. | 348/231.4 |

FOREIGN PATENT DOCUMENTS

| | | |
|---|---|---|
| JP | 7-13235 | 1/1995 |
| JP | 2000-010162 | 1/2000 |
| JP | 2000-307902 | 11/2000 |
| JP | 2001-109054 | 4/2001 |
| JP | 2005-101903 | 4/2005 |
| JP | 2008-211485 | 9/2008 |
| JP | 2009-128840 | 6/2009 |

* cited by examiner

*Primary Examiner* — Clayton E Laballe
*Assistant Examiner* — Bret Adams
(74) *Attorney, Agent, or Firm* — Panasonic Patent Center (57) ABSTRACT

An imaging apparatus includes an input unit configured to receive an instruction for starting a continuous shooting operation, a sound output unit configured to output a predetermined sound according to a shooting operation, and a controller configured to control output/non-output of the predetermined sound from the sound output unit according to a setting of sound output, and to control the continuous shooting operation. The setting of sound output includes an ON setting for outputting the predetermined sound from the sound output unit according to a start of the shooting operation and an OFF setting for non-outputting the predetermined sound from the sound output unit according to the start of the shooting operation. When receiving the instruction for starting the continuous shooting operation via the input unit with the setting of sound output being the OFF setting and the shooting interval in the continuous shooting operation being set to be variable, the controller performs a control so as to prevent the continuous shooting operation at the variable shooting interval from being performed in a state that the predetermined sound according to the shooting operation is not output.

7 Claims, 6 Drawing Sheets

IMAGING APPARATUS

BACKGROUND

1. Technical Field

The technical field relates to an imaging apparatus capable of continuously recording (continuous shooting) still images, and more particularly to the imaging apparatus capable of changing a shooting interval during the continuous shooting.

2. Related Art

Imaging apparatus such as a digital camera that can record still image continuously (continuous shoot) while a release button is being pressed down is known. JP2000-10162A discloses an imaging apparatus that enables such continuous shooting. JP2000-10162A particularly discloses the imaging apparatus capable of changing a shooting interval during the continuous shooting according to a motion of a subject. This imaging apparatus has an imaging unit configured to capture a subject to output image information, a subject speed detector configured to detect a moving speed of the subject in a shooting region based on the image information output from the imaging unit, and a continuous shooting controller configured to control a capturing interval (continuous shooting interval) in the continuous shooting according to the moving speed of the subject detected by the subject speed detector. With this configuration, for example, a release interval is shortened when a motion of a subject is fast, whereas the release interval is lengthened when the motion of the subject is slow. This arrangement allows a photo opportunity to be prevented from being missed according to the motion of the subject, and allows an opportunity for taking continuous shots which have less difference in the subject to be reduced in the continuous shooting operation.

On the other hand, a user can set a shutter sound to ON/OFF at the time of pressing down a release button in some of conventional digital cameras. For example, JP2000-307902A, discloses an imaging apparatus that can emit a pseudo shutter sound at the time of performing a shooting operation according to pressing-down of a release button.

When the above continuous shooting at the variable shooting interval is performed in a case where the shutter sound in the imaging apparatus is set to OFF, a user hardly recognizes a timing at which the shooting operation is performed because the shutter sound is not emitted. For this reason, it is difficult to determine a field angle during the continuous shooting, and thus preferable continuous images cannot be shot, thereby deteriorating user's convenience at the time of the continuous shooting.

SUMMARY

In view of the above problem, an imaging apparatus capable of improving user's convenience in the continuous shooting is provided. That is to say, an object is to provide the imaging apparatus which can avoid a situation that a plurality of images are continuously shot in a state that the user cannot recognize shooting timing in the continuous shooting.

In a first aspect, an imaging apparatus which enables a continuous shooting operation for continuously shooting still images is provided. The imaging apparatus includes an input unit configured to receive an instruction for starting a continuous shooting operation, a sound output unit configured to output a predetermined sound according to a shooting operation, and a controller configured to control output/non-output of the predetermined sound from the sound output unit according to a setting of sound output and to control the continuous shooting operation. The setting of sound output includes an ON setting for outputting the predetermined sound from the sound output unit according to the start of a shooting operation, and an OFF setting for non-outputting the predetermined sound from the sound output unit according to the start of the shooting operation. A shooting interval in the continuous shooting operation can be set to be variable. When receiving the instruction for starting the continuous shooting operation via the input unit with the setting of sound output being the OFF setting and the shooting interval in the continuous shooting operation being set to be variable, the controller controls at least one of the output of the predetermined sound and the continuous shooting operation so as to prevent the continuous shooting operation at the variable shooting interval from being performed in a state that the predetermined sound according to the shooting operation is not output.

According to the aspect, in a case where the setting is made such that a predetermined sound (for example, a shutter sound) is not output, when the continuous shooting is tried to be performed at the variable shooting interval, a control is performed so as to prevent the continuous shooting operation at the variable shooting interval from being performed in the state that the predetermined sound according to the shooting operation is not output (for example, the shooting interval in the continuous shooting is set to a fixed value). As a result, a situation that a plurality of images are continuously shot in the state that the user cannot recognize the shooting timing can be avoided, thereby reducing a generating frequency of failing images. As a result, the imaging apparatus capable of improving the convenience of the continuous shooting can be provided.

DETAILED DESCRIPTION OF PREFERRED EMBODIMENTS

An embodiment is described below by using a digital camera as one example of an imaging apparatus.

The digital camera to be described in the embodiment below has a function for emitting a pseudo shutter sound in a shooting operation according to pressing-down of a release button at the time of still image shooting, and can set whether or not the shutter sound is emitted (output). Hereinafter, when the shutter sound is set to ON, the shutter sound is emitted according to the shooting operation, and when the shutter sound is set to OFF, the shutter sound is not emitted regardless of the shooting operation. Further, the digital camera has a function for variably changing the capturing interval (a continuous shooting interval) in the continuous shooting. The capturing interval (the continuous shooting interval) in the continuous shooting can be changed according to, for example, a motion of a subject or a user's operation. The digital camera can record still images (single shooting/continuous shooting) while recording moving images. The embodiment will be described in detail below.

First Embodiment

1. Configuration of Digital Camera

Figure 1:
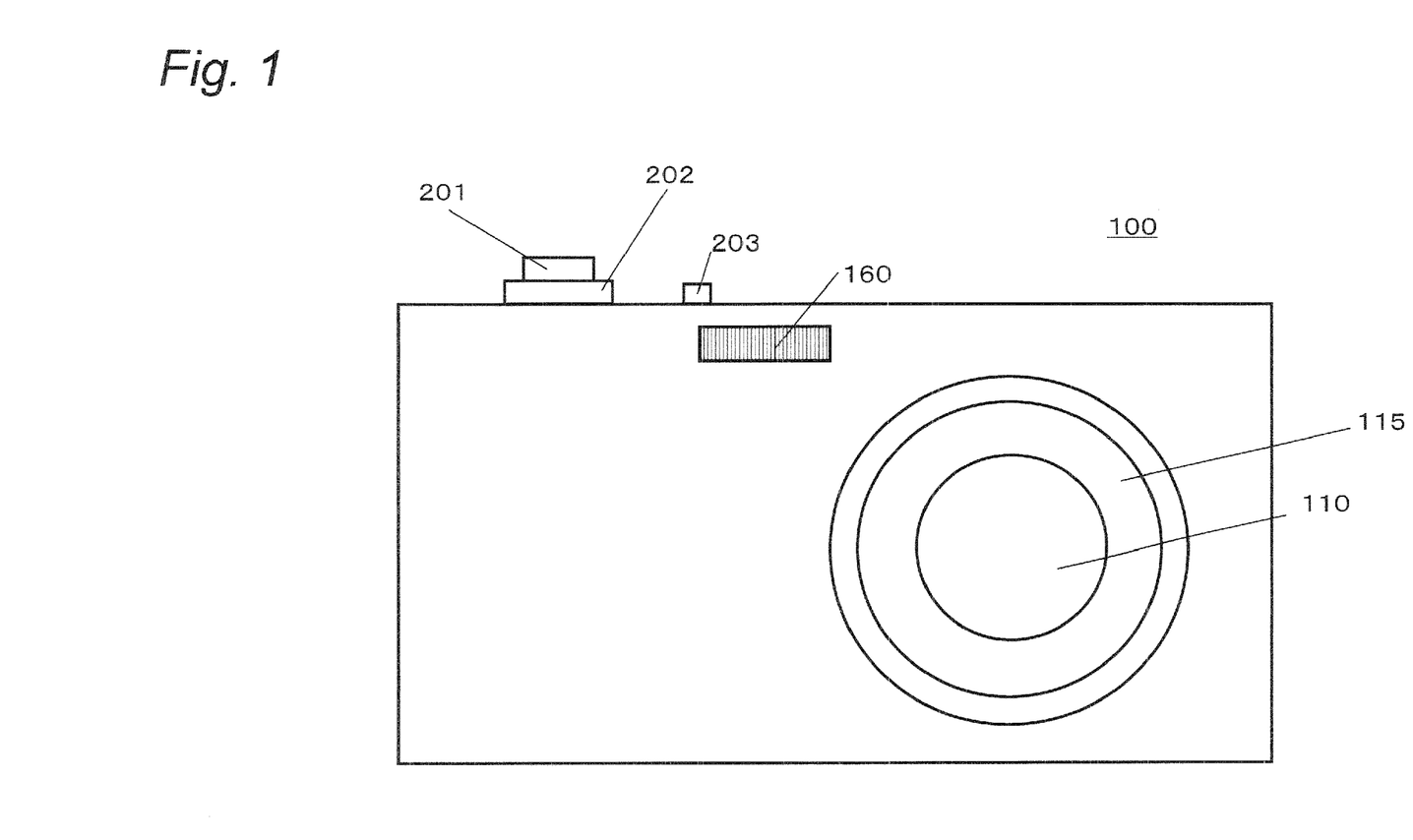
FIG. 1 is a front configuration diagram illustrating a digital camera according to a first embodiment.

FIG. 1 is a front view illustrating the digital camera according to the first embodiment. The digital camera 100 has a lens barrel housing an optical system 110 at its front, and a flash 160. The digital camera 100 has operation buttons such as a still image release button 201, a zoom lever 202, and a power button 203 on its upper surface.

Figure 2:
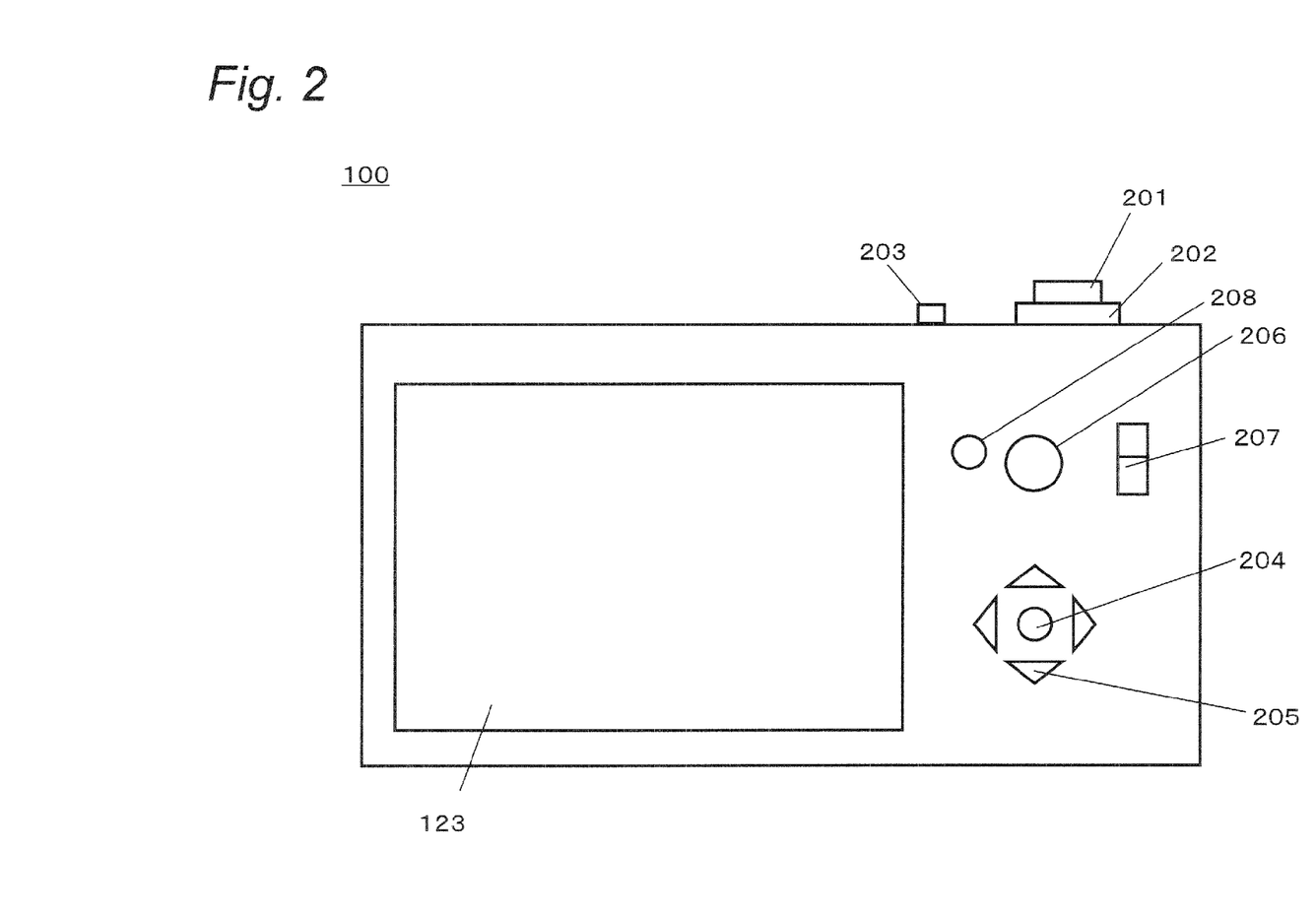
FIG. 2 is a rear configuration diagram illustrating the digital camera according to the first embodiment.

FIG. 2 is a rear view illustrating the digital camera 100. The digital camera 100 has a liquid crystal display (LCD) monitor 123 and operation buttons on its rear surface. The operation buttons include a center button 204, cross buttons 205, a moving image release button 206, mode changing-over switches 207, and a continuous shooting mode changing-over button 208.

Figure 3:
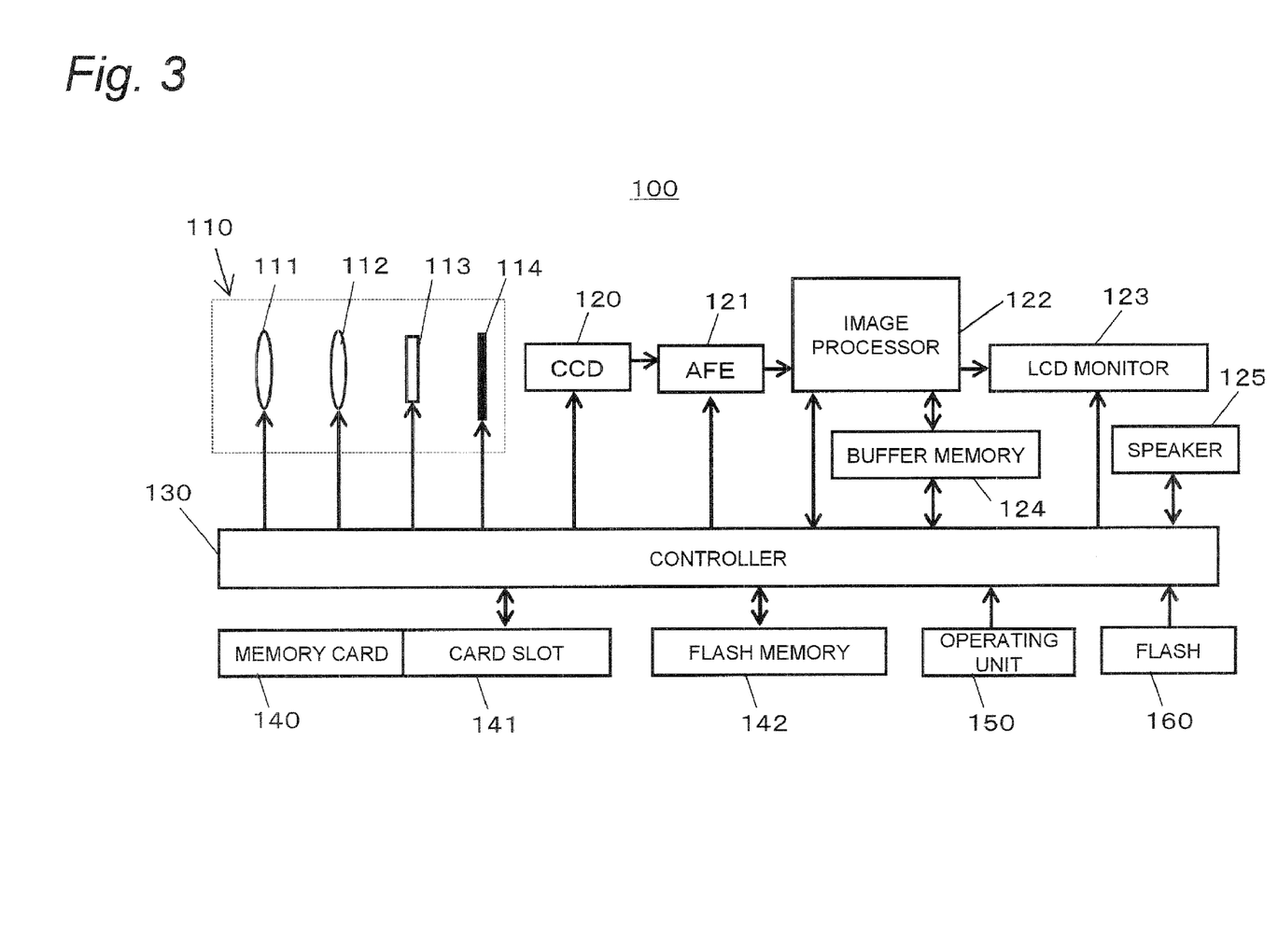
FIG. 3 is an electric configuration diagram illustrating the digital camera according to the first embodiment.

FIG. 3 is an internal configuration diagram of the digital camera 100. The digital camera 100 takes a subject image formed via the optical system 110 using a CCD image sensor 120. The CCD image sensor 120 generates image information based on the shot subject image. The image information generated by the CCD image sensor 120 is subject to various processes in AFE (analog front end) 121 and an image processor 122. The image information that was subject to the various processes recorded in recording media such as a flash memory 142 and a memory card 140. The image information recorded in the flash memory 142 and the memory card 140 can be displayed on the liquid crystal display monitor 123 according to a users operation of an operating unit 150. Respective components of the digital camera 100 will be described below more concretely.

The optical system 110 includes a focus lens 111, a zoom lens 112, a diaphragm 113, a shutter 114 and the like. The optical system 110 may further include an optical camera shake correction lens OIS (Optical Image Stabilizer). Various lenses configuring the optical system 110 may include any number of lenses or any number groups of lenses.

The focus lens 111 is used for adjusting a focus state of a subject. The zoom lens 112 is used for adjusting a field angle of a subject. The diaphragm 113 is used for adjusting an amount of light incident on the CCD image sensor 120. The shutter 114 adjusts exposure time of the light incident on the CCD image sensor 120. The focus lens 111, the zoom lens 112, the diaphragm 113, and the shutter 114 are driven by corresponding drivers such as a DC motor and a stepping motor according to a control signal from a controller 130.

The CCD image sensor 120 captures a subject image formed through the optical system 110 to generate the image information. When the digital camera 100 is in a shooting mode, the CCD image sensor 120 can generate image information about new frame at every constant time.

The AFE 121 performs noise repression according to correlated double sampling, amplification to an input range width of an A/D converter by means of an analog gain controller, and A/D conversion by means of the A/D converter on the image information read from the CCD image sensor 120. The AFE 121 outputs the image information that was subject to the above processes to the image processor 122.

The image processor 122 gives various processes to the image information output from the AFE 121. Examples of the various processes are, but not limited to, smear correction, white balance correction, gamma correction, a YC converting process, an electronic zoom process, a compression process, and an decompression process. The image processor 122 stores the image information that was subject to the various processes into a buffer memory 124. The image processor 122 may include a hard-wired electronic circuit or a microcomputer using a program or the like.

The liquid crystal display monitor 123 is provided to the rear surface of the digital camera 100. The liquid crystal display monitor 123 displays an image based on the image information processed by the image processor 122. The liquid crystal display monitor 123 can display a through image or a recorded image. The through image is an image of a frame generated by the CCD image sensor 120 at every constant time, and is displayed continuously. When the digital camera 100 is in the shooting mode, the image processor 122 generates the through image based on the image information generated by the CCD image sensor 120. A user refers to the through image displayed on the liquid crystal display monitor 123 so as to be capable of photographing a subject while checking a composition of the subject. The recorded image is an image to be displayed based on an image recorded in a recording medium such as the memory card 140. The recording medium is displayed when the digital camera 100 is in a reproducing mode. The recorded image is generated by reducing a large number of pixels of the image recorded in the recording medium such as the memory card 140 to a small number of pixels of the recorded image in order to display the large number of pixels of the recorded image on the liquid crystal display monitor 123. After the user operates the release button 201, the image information on the large number of pixels of the image to be recorded in the memory card 140 is generated by the image processor 122 based on the image information generated by the CCD image sensor 120.

The controller 130 controls the entire operation of the digital camera 100 in an integrated manner. The controller 130 records, in the recording medium such as the memory card 140, the image information that is processed by the image processor 122 and is temporarily stored in the buffer memory 124. The controller 130 includes a ROM for storing information such as programs, and a CPU for executing programs so as to process various information. The ROM stores programs relating to file control, autofocus (AF) control, auto exposure (AE) control, and light emission control of the flash 160, and a program for controlling the entire operation of the digital camera 100 in the integrated manner.

The controller 130 may include a hard-wired electronic circuit or a microcomputer. The controller 130 may include one semiconductor chip together with the image processor 122. The ROM does not have to be provided in the controller 130, and may be provided to an outside of the controller 130.

The buffer memory 124 is a storage unit that functions as work memories of the image processor 122 and the controller 130. The buffer memory 124 can be realized by DRAM (Dynamic Random Access Memory) or the like. The flash memory 142 functions as an internal memory for recording the image information or the like.

A speaker 125 outputs predetermined sounds such as a shutter sound emitted at the time of the shooting operation and a beep sound emitted according to button operations. These sound data are stored in the flash memory 142.

A card slot 141 is a unit for attaching the memory card 140 to the digital camera 100. The card slot 141 can electrically and mechanically connect the memory card 140 to the digital camera 100. The card slot 141 may have a function for controlling the memory card 140.

The memory card 140 is a recording medium having a recording element such as a flash memory inside, and is an external memory of the digital camera 100. The memory card 140 can record data such as the image information to be processed by the image processor 122.

The operating unit 150 is a general name of operating buttons and operating dials provided to an exterior of the digital camera 100, and receives an operation of the digital camera 100 from a user. Examples of the operating unit 150 include the still image release button 201, the moving image release button 206, the zoom lever 202, the power button 203, the center button 204, the cross buttons 205, the mode changing-over switches 207, the continuous shooting mode changing-over button 208 shown in FIG. 1 and FIG. 2. When the operating unit 150 receives the operation from the user, it transmits various operation instructing signals to the controller 130.

The continuous shooting mode changing-over button 208 is a button for changing over a continuous shooting mode, and is a push button. The continuous shooting mode is one kind of the shooting mode. The continuous shooting mode can be changed over to setting (mode) of single shooting (continuous shooting invalid), high-speed continuous shooting, medium-speed continuous shooting, low-speed continuous shooting, and continuous shooting at variable shooting interval. That is to say, in the setting of these modes, changing-over between the continuous shooting mode and single shooting mode, and the shooting interval in the continuous shooting are set. When the user presses down the continuous shooting mode changing-over button 208, the controller 130 determines the continuous shooting mode. That is to say, every time when the user presses down the continuous shooting mode changing-over button 208, the continuous shooting mode is changed over to the single shooting, the high-speed continuous shooting, the medium-speed continuous shooting, the low-speed continuous shooting, the continuous shooting at variable shooting interval, the single shooting . . . in this order in a circulating manner. Information about the continuous shooting mode set by pressing down the continuous shooting mode changing-over button 208 is recorded in the flash memory 142.

Collectively, the high-speed continuous shooting, the medium-speed continuous shooting, the low-speed continuous shooting and the continuous shooting at variable shooting interval in the continuous shooting mode are simply called as "continuous shooting". In the high-speed continuous shooting, the medium-speed continuous shooting and the low-speed continuous shooting in the continuous shooting, the capturing interval (the continuous shooting interval) in the continuous shooting is set to a fixed value (constant value). The continuous shooting interval of the high-speed continuous shooting is the shortest in the continuous shooting modes, and hereinafter, the continuous shooting interval becomes longer in order of the medium-speed continuous shooting and the low-speed continuous shooting. On the contrary, the continuous shooting interval in the continuous shooting at variable shooting interval is changed according to a motion of a subject. Concretely, the continuous shooting interval is changed so that the larger the motion of the subject is, the shorter the continuous shooting interval is, and the smaller the motion is, the longer the continuous shooting interval is.

The still image release button 201 is a push button for instructing a still image recording (photographing) operation and an autofocus (AF) operation. The still image release button 201 can be in two states of a half-press state and a full-press state. When the digital camera 100 is in the shooting mode and the still image release button 201 is half-pressed by the user, the controller 130 performs the autofocus (AF) control or auto exposure (AE) control so as to determine a shooting condition. Thereafter, when the still image release button 201 is full-pressed, the controller 130 executes the shooting process according to the set continuous shooting mode. For example, when the set continuous shooting mode is "the single shooting", the controller 130 records image information captured at the full-press timing as a still image in the memory card 140 or the like. Further, in a case where the set continuous shooting mode is "the continuous shooting", while the still image release button 201 is being pressed down, capturing is performed continuously at the continuous shooting interval set in the continuous shooting mode, and the captured image information is recorded as the still image in the memory card 140. Hereinafter, the description that the still image release button 201 is pressed down means "full press" of the still image release button 201.

The moving image release button 206 is a push button for instructing start/end of recording of moving images. When the user presses down the moving image release button 206, the controller 130 sequentially records the image information, which is generated by the image processor 122 based on the image information generated by the CCD image sensor 120, as a moving image in the recording medium such as the memory card 140. When the moving image release button 206 is again pressed down during the recording of the moving image, the controller 130 ends the recording of the moving image.

The zoom lever 202 is a lever that returns to its center position by itself for adjusting a field angle between a wide-angle end and a telephoto end. When the user operates the zoom lever 202, the zoom lever 202 transmits an operation instructing signal for driving the zoom lens 112 to the controller 130. That is to say, when the zoom lever 202 is operated to a side of the wide-angle end, the controller 130 drives the zoom lens 112 so that a subject is captured at a wide angle. Similarly, when the zoom lever 201 is operated to a side of the telephoto end, the controller 130 drives the zoom lens 112 so that a subject is captured at the telephoto end.

The power button 203 is a push button for setting power supply to the respective units configuring the digital camera 100 to ON/OFF. When the user presses down the power button 203 at the time of power OFF, the controller 130 supplies a power to the respective units configuring the digital camera 100 so as to activate the digital camera 100. When the user presses down the power button 203 at the time of power ON, the controller 130 stops the power supply to the respective units.

The center button 204 is a push button. When the digital camera 100 is in the shooting mode or the reproducing mode and the user presses down the center button 204, the controller 130 displays a menu screen on the liquid crystal display monitor 123. The menu screen is a screen for setting various conditions for the shooting/reproduction, and the shutter sound can be changed over to ON and OFF on this screen. Information set on the menu screen including the changing-over of the shutter sound between ON and OFF is recorded in the flash memory 142. When being pressed down in a state that setting items of the various conditions are selected, the center button 204 functions also as a determination button.

The cross buttons 205 are push buttons provided to up, down, right and left directions. When the user presses down any one of the cross buttons 205, various items to be displayed on the liquid crystal display monitor 123 can be selected.

The mode changing-over switches 207 are push buttons provided to up and down directions. When the user presses down any one of the mode changing-over switches 207, the operation mode of the digital camera 100 can be changed over to the shooting mode or the reproducing mode.

The CCD image sensor 120 is one example of an imaging unit. The still image release button 201 is one example of an input unit. The speaker 125 is one example of a sound output unit. The controller 130 is one example of a controller.

2. Shooting Operation of Digital Camera

Figure 4:
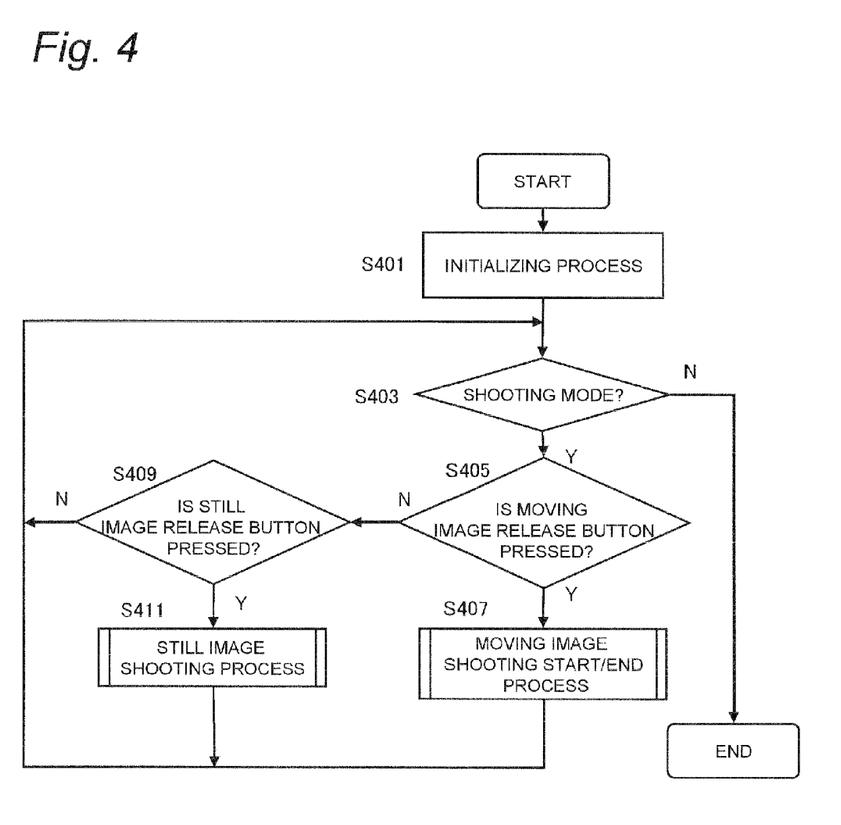
FIG. 4 is a flowchart illustrating a flow of process in a shooting mode according to the first embodiment.

Control of the image shooting operation in the digital camera 100 will be described. FIG. 4 is a flowchart illustrating the control of the shooting operation in the digital camera 100.

When the user operates the mode changing-over switches 207 so that the digital camera 100 transfers to the shooting mode, the controller 130 executes an initializing process necessary for recording still images/moving images (S401).

After the completion of the initialization, the controller 130 repeats a process for checking a user's operation. As the process for checking a user's operation, the controller 130 concretely repeats a check for a state of the mode changing-over switches 207 (S403), detection of the pressing-down of the moving image release button 206 (S405), and detection of the pressing-down of the still image release button 201 (S409). At this time, if the state of the mode changing-over switches 207 is not the shooting mode (NO at step S403), this process is ended.

If the state of the mode changing-over switches 207 is the shooting mode (YES at step S403), when the controller 130 detects the pressing-down of the moving image release button 206, the moving image shooting start/end process is executed (S407). When the controller 130 detects the pressing-down of the still image release button 201 by the user, the still image shooting process is executed (S411).

Figure 5:
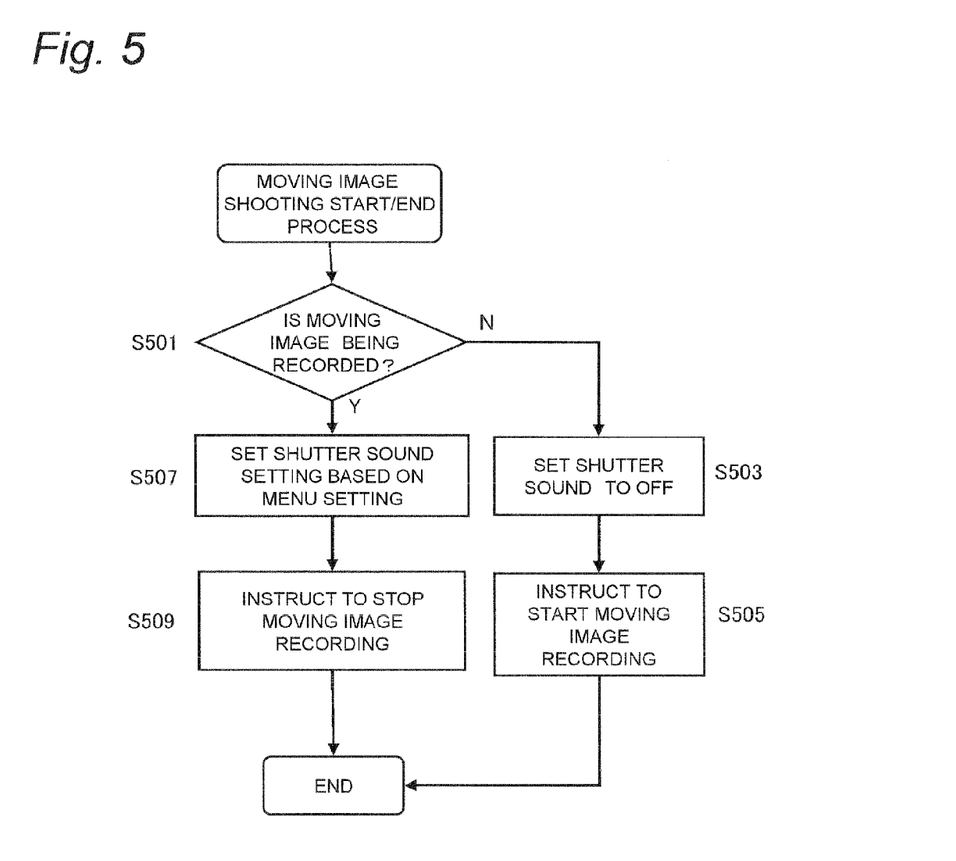
FIG. 5 is a flowchart illustrating a flow of a moving image shooting start/end process according to the first embodiment.

The moving image shooting start/end process (step S407) will be described in detail with reference to a flowchart of FIG. 5. FIG. 5 is the flowchart illustrating a flow of the moving image shooting start/end process.

In the moving image shooting start/end process, when the controller 130 detects the pressing-down of the moving image release button 206 by the user, it determines whether or not the digital camera 100 is recording a moving image (S501).

When the digital camera 100 is not recording a moving image (NO at step S501), that is, the moving image recording operation is not yet started, the pressing-down of the moving image release button 206 starts the moving image recording operation. In this case, in this embodiment, the controller 130 temporarily sets the shutter sound to OFF (S503). Even when a still image is photographed while the moving image is being recorded in this process, the shutter sound is not emitted. For this reason, the shutter sound is prevented from being included as a noise in the sound recorded together with the moving image.

Thereafter, the controller 130 instructs the image processor 122 to start the recording of a moving image (S505). According to this instruction, the image processor 122 executes a predetermined process based on the image information generated by the CCD image sensor 120. The image information subject to the predetermined process is sequentially recorded as the moving image in the recording medium such as the memory card 140. These processes are executed until an instruction for stopping the recording of the moving image is received by again pressing down the moving image release button 206.

On the other hand, when the digital camera 100 is recording a moving image (YES at step S501), the controller 130 reflects setting contents of the shutter sound set by the user in advance on the menu screen as the setting of the shutter sound (S507). As a result, the setting of the shutter sound is returned to the state before starting the recording of the moving image.

Thereafter, the controller 130 instructs the image processor 120 to stop the recording of the moving image (S509).

In the digital camera 100 according to this embodiment, the shutter sound is forcibly set to OFF at the time of starting the recording of a moving image, and the shutter sound is set to the state before starting the recording of a moving image, that is, the setting content set purposely by the user at the time of ending the recording of the moving image. As a result, the shutter sound is prevented from being recorded as a noise during the recording of a moving image, and the setting state intended by the user can be restored after ending the recording of the moving image.

Figure 6:
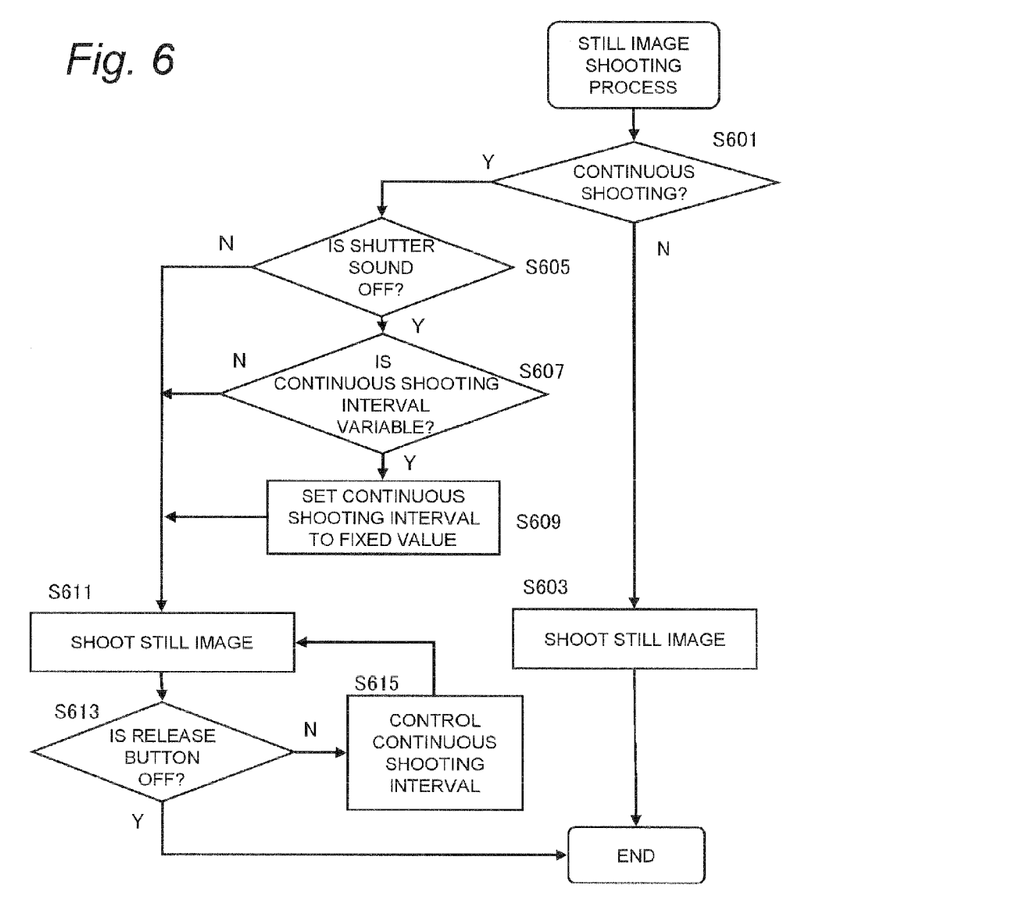
FIG. 6 is a flowchart illustrating a flow of a still image shooting process according to the first embodiment.

A still image shooting process (step S411) will be described in detail below with reference to a flowchart of FIG. 6. FIG. 6 is the flowchart illustrating a flow of the still image shooting process.

When the controller 130 detects the pressing-down of the still image release button 201 by the user, it determines whether or not the continuous shooting mode of the digital camera 100 is "continuous shooting" (S601). When the continuous shooting mode is "the single shooting" (continuous shooting invalid), the controller 130 records a still image generated by the image processor 122 based on the image information generated by the CCD image sensor 120 in the recording medium such as the memory card 140 at a timing at which the still image release button 201 is pressed down (S603).

On the other hand, when the continuous shooting mode is "the continuous shooting", the controller 130 determines whether or not the shutter sound is set to OFF (S605). When the shutter sound is set to OFF, the controller 130 further determines whether or not the continuous shooting mode is the continuous shooting at variable shooting interval (S607). When the continuous shooting mode is the continuous shooting at variable shooting interval, the controller 130 sets the continuous shooting interval to the fixed value (S609). Concretely, the controller 130 changes the continuous shooting mode into the high-speed continuous shooting where the continuous shooting interval is the shortest. Thereafter, the controller 130 executes the still image shooting process (S611). Since the setting is changed in such a manner, the continuous shooting is not executed at the variable shooting interval in the state that the shutter sound is set to OFF. Therefore, the following problem can be solved. The problem is such that the user's convenience is deteriorated because the shutter sound is not emitted during the continuous shooting.

When the setting of the shutter sound is determined as ON at step S605 or when it is determined at step S607 that the continuous shooting mode is not the continuous shooting at variable shooting interval, the controller 130 executes the still image shooting process based on the continuous shooting mode set by the user in advance (S611).

The controller 130 records the still image, which is generated by the image processor 122 based on the image information generated by the CCD image sensor 120, in the recording medium such as the memory card 140 at a timing at which the still image shooting process (S611) is executed.

After the still image shooting process is completed, the controller 130 determines whether or not the still image release button 201 is released by the user to be in the OFF state (S613). When the still image release button 201 is in the OFF state, the control of the continuous shooting is ended. When the still image release button 201 is being pressed down to be maintained in the ON state, a continuous shooting interval control process is executed for shooting a next image (S615). The continuous shooting interval control process means a process for controlling waiting time until the shooting of the next image is started. The waiting time changes according to the continuous shooting interval set in the continuous shooting mode. That is to say, in the case of the high-speed continuous shooting, the waiting time is shortened and in the case of the low-speed continuous shooting, the waiting time is lengthened.

Concretely, when the continuous shooting mode is the continuous shooting at variable shooting interval, the continuous shooting interval control process is executed as follows. The controller 130 detects a motion vector between two pieces of the image information continuously generated by the CCD image sensor 120, and evaluates a size of the motion between two pieces of the image information. The controller 130 sets the continuous shooting interval for shooting each image according to the evaluated result. Concretely, the larger the motion is, the shorter the continuous shooting interval is set to, and the smaller the motion is, the longer the continuous shooting interval is set to. The CCD image sensor 120 repeats the shooting operation at a constant cycle shorter than the continuous shooting interval during the continuous shooting, and the controller 130 makes this evaluation and sets the continuous shooting interval every time the shooting operation is performed. Such a control enables the continuous shooting interval to be set according to the motion of the subject at real time.

When the waiting time according to the continuous shooting mode passes, a shooting process for a next still image is executed (S611).

3. Conclusion

The digital camera 100 according to this embodiment is the imaging apparatus that can perform the continuous shooting operation for continuously shooting still images. The digital camera 100 includes the still image release button 201 configured to receive the instruction for starting the continuous shooting operation, the speaker 125 configured to output the shutter sound according to the shooting operation, and the controller 130 configured to control the output/non-output of the shutter sound from the speaker 125 according to the setting of sound output and control the continuous shooting operation. The setting of sound output includes the ON setting for outputting the shutter sound according to the start of the shooting operation and the OFF setting for non-outputting the shutter sound according to the start of the shooting operation. The capturing interval (the continuous shooting interval) during the continuous shooting operation can be set to be variable. When receiving the instruction for starting the continuous shooting operation via the still image release button 201 with the setting of sound output being the OFF setting and the shooting interval during the continuous shooting operation being set to be variable, the controller 130 controls at least one of the output of the shutter sound and the continuous shooting operation so as to prevent the continuous shooting operation at the variable shooting interval from being performed in the state that the shutter sound according to the shooting operation is not output.

With such a configuration, when the user tries to perform the continuous shooting in the continuous shooting at variable shooting interval mode in the setting state that the shutter sound is not emitted, the continuous shooting operation at the variable shooting interval is prevented from being performed in the state that the shutter sound according to the shooting operation is not output (for example, the shooting interval in the continuous shooting is set to the fixed value). As a result, a situation where a plurality of images are continuously shot in a state that the user cannot recognize the shooting timing can be avoided, thereby reducing generating frequency of failing images.

4. Other Embodiments

The present embodiment is not limited to the above embodiment, and various embodiments are considered. Other embodiments will be described below.

In the above embodiment, one example is described that, when the shutter sound is set to OFF and the continuous shooting at variable shooting interval mode is set, the continuous shooting mode is automatically changed into the high-speed continuous shooting mode where the continuous shooting interval is the shortest. However, the idea of the present embodiment is not limited to this, and the continuous shooting mode may be changed into another continuous shooting mode having a fixed continuous shooting interval or into single shooting. Further, instead of setting the continuous shooting interval to the fixed value, when the shutter sound is set to OFF and the continuous shooting at variable shooting interval mode is set, the shooting operation may be prohibited. With this method, the still image shooting is not performed, thereby preventing failing images that are caused when the still image shooting is performed at timing that is not intended by the user.

In another manner, when the shutter sound is set to OFF and the continuous shooting at variable shooting interval mode is set, the shutter sound is set to ON and the continuous shooting at variable shooting interval may be performed. As a result, since the user can confirm the shutter sound during the continuous shooting, the shooting timing can be recognized and the shooting of failing images can be prevented. That is to say, when the shutter sound is set to OFF and the continuous shooting at variable shooting interval mode is set, at least one of the setting of the shutter sound to OFF and the variable shooting interval function in the continuous shooting at variable shooting interval mode may be prevented from being functioned. In other words, when the shutter sound is set to OFF and the continuous shooting at variable shooting interval mode is set, at least the shutter sound may be set to ON or the shooting interval in the continuous shooting at variable shooting interval mode may be set to the fixed value.

In the above embodiment, the still image shooting operation is started according to the pressing-down of the still image release button 201, but the image information captured by the CCD image sensor 120 may be evaluated by the image processor 122, and the still image shooting operation may be started according to the evaluated result. For example, when a determination is made that a facial expression detected from the image information is a smiley face, the still image shooting operation may be started. In this case, the image processor 122 and the controller 130 are input units for receiving the instruction for starting the continuous shooting.

The digital camera 100 may have a function such that the user can manually change the shooting interval in the continuous shooting via a dial operation or the like. In the digital camera 100 having such a function, if the shutter sound is set to OFF, when the user performs the operation for changing the shooting interval in the continuous shooting, the shooting interval is preferably controlled not to be changed (that is, the shooting interval is set to a fixed value).

Further, the process at step S605 to S615 in the flowchart of FIG. 6 may be executed only when the still image continuous shooting is instructed during the recording of a moving image. In the embodiment, when a moving image is once started to be recorded, the shutter sound is forcibly set to OFF regardless of user's intention (see step S503 in FIG. 5). For this reason, at the time of the continuous shooting during the recording of a moving image, the shutter sound is not emitted, and the user cannot recognize the shooting timing. Therefore, the above-described control (steps S605 to S615) is performed, so that user's inconvenience caused by the silent shutter sound can be improved. On the contrary, when the still image continuous shooting is instructed while a moving image is not being recorded, the shutter sound is controlled based on the setting set by the user. That is to say, even if the shutter sound is silent, the silent shutter sound is set by the user's intention, and thus this does not particularly produce a problem to the user.

INDUSTRIAL APPLICABILITY

The present embodiment is useful for imaging apparatuses such as digital still cameras, movie cameras and mobile telephones in which the user's convenience in the continuous shooting can be improved and the shooting interval in the continuous shooting can be changed according to a motion of a subject or the like.

What is claimed is:

1. An imaging apparatus capable of performing a continuous shooting operation for continuously shooting still images, the imaging apparatus comprising:
   an input unit configured to receive an instruction for starting the continuous shooting operation;
   a sound output unit configured to output a predetermined sound according to a shooting operation; and
   a controller configured to control output/non-output of the predetermined sound from the sound output unit according to a setting of sound output, and to control the continuous shooting operation, wherein
   the setting of sound output includes an ON setting for outputting the predetermined sound from the sound output unit according to a start of the shooting operation and an OFF setting for non-outputting the predetermined sound from the sound out unit according to the start of the shooting operation,
   a shooting interval in the continuous shooting operation can be set to be variable, and
   when receiving the instruction for starting the continuous shooting operation via the input unit with the setting of sound output being the OFF setting and the shooting interval in the continuous shooting operation being set to be variable, the controller controls at least one of the output of the predetermined sound or the continuous shooting operation so as to prevent the continuous shooting operation at the variable shooting interval from being performed in a state that the predetermined sound according to the shooting operation is not output.

2. The imaging apparatus according to claim 1, further comprising:
   an imaging unit configured to capture a subject to generate image data; and
   a motion detector configured to detect a motion of the subject based on the image data,
   wherein the controller controls the shooting interval in the continuous shooting operation according to the motion of the subject detected by the motion detector.

3. The imaging apparatus according to claim 1, wherein only while recording a moving image, the controller performs the control of at least one of the output of the predetermined sound or the continuous shooting operation to prevent the continuous shooting operation at the variable shooting interval from being performed in a state that the predetermined sound according to the shooting operation is not output, when receiving the instruction for starting the continuous shooting operation via the input unit with the setting of sound output being the OFF setting and the shooting interval in the continuous shooting operation being set to be variable.

4. The imaging apparatus according to claim 1, wherein in a case where the setting of sound output is the OFF setting and the shooting interval in the continuous shooting operation is set to be variable when the controller receives the instruction for starting the continuous shooting via the input unit, the controller controls an interval of the shooting operation in the continuous shooting operation to be a fixed value.

5. The imaging apparatus according to claim 1, wherein in a case where the setting of sound output is the OFF setting and the shooting interval in the continuous shooting operation is set to be variable when the controller receives the instruction for starting the continuous shooting via the input unit, the controller prohibits the continuous shooting operation.

6. An imaging apparatus capable of performing a continuous shooting operation for continuously shooting still images, the imaging apparatus comprising:
   an input unit configured to receive an instruction for starting the continuous shooting operation at a variably set shooting interval or a fixed shooting interval;
   a sound output unit configured to be set to an ON setting to enable a predetermined sound to be output according to a shooting operation or an OFF setting to prohibit the predetermined sound to be output according to the shooting operation; and
   a controller configured to control the ON/OFF setting of the sound output unit and to control the continuous shooting operation, wherein
   when receiving the instruction for starting the continuous shooting operation at the variably set shooting interval via the input unit, the controller controls at least one of the sound output unit or the continuous shooting operation so as to prevent the continuous shooting operation at the variable set shooting interval from being performed with the sound output unit set to the OFF setting.

7. The imaging apparatus according to claim 6, wherein when the sound output unit is set to the OFF setting and the instruction for starting the continuous shooting operation at the variably set shooting interval is received via the input unit, the controller controls the sound output unit to be changed to the ON setting or controls the continuous shooting operation to changed to the fixed shooting interval.

* * * * *

UNITED STATES PATENT AND TRADEMARK OFFICE
CERTIFICATE OF CORRECTION

| | |
|---|---|
| PATENT NO. | : 8,358,927 B2 |
| APPLICATION NO. | : 13/197858 |
| DATED | : January 22, 2013 |
| INVENTOR(S) | : Ken Ishida |

It is certified that error appears in the above-identified patent and that said Letters Patent is hereby corrected as shown below:

In Column 11, Lines 38-40, related to Claims,

"... an OFF setting for non-outputting the predetermined sound from the sound out unit according to the start of the shooting operation, ..." should read
--... an OFF setting for non-outputting the predetermined sound from the sound output unit according to the start of the shooting operation, ...--

Signed and Sealed this
Seventh Day of May, 2013

Teresa Stanek Rea
*Acting Director of the United States Patent and Trademark Office*